United States Patent [19]

Clark

[11] Patent Number: 5,324,934
[45] Date of Patent: Jun. 28, 1994

[54] FIBEROPTIC ENCODER FOR LINEAR MOTORS AND THE LIKE

[75] Inventor: Lee Clark, Ewing, N.J.

[73] Assignee: Megamation Incorporated, Lawrenceville, N.J.

[21] Appl. No.: 694,382

[22] Filed: May 1, 1991

[51] Int. Cl.⁵ .............................................. G01D 5/34
[52] U.S. Cl. ............................ 250/231.13; 250/227.21
[58] Field of Search .................. 250/202, 206.1, 227.21, 250/231.13, 231.14, 231.15, 231.16, 231.17, 231.18, 237 G, 227.11, 227.20, 227.21, 227.28, 227.31, 227.32; 901/47

[56] References Cited

U.S. PATENT DOCUMENTS

| | | | |
|---|---|---|---|
| 3,297,879 | 1/1967 | Meyer | 250/237 |
| 3,622,793 | 11/1971 | Dalton et al. | 250/227.21 |
| 4,096,383 | 6/1978 | Mancini et al. | 250/231.14 |
| 4,147,977 | 4/1979 | Dimmick | 250/227.11 |
| 4,278,881 | 7/1981 | Mann | 250/227.21 |
| 4,356,395 | 10/1982 | Miller | 250/227.21 |
| 4,387,299 | 6/1983 | Akiyama | 250/231.14 |
| 4,536,649 | 8/1985 | Kozai | 250/231.16 |
| 4,631,401 | 12/1986 | Parkhurst | 250/227.21 |
| 4,659,924 | 4/1987 | Tokunga | 250/231.16 |
| 4,704,523 | 11/1987 | Uchida | 250/231.16 |
| 4,795,913 | 1/1989 | Blessing et al. | 250/227.2 |
| 4,823,062 | 4/1989 | Hoffman et al. | 318/687 |
| 4,890,241 | 12/1989 | Hoffman et al. | 364/513 |
| 4,953,933 | 9/1990 | Asmar | 250/231.18 |
| 4,972,080 | 11/1990 | Taniguchi | 250/231.16 |
| 5,148,020 | 9/1992 | Machida | 250/231.16 |

FOREIGN PATENT DOCUMENTS 3408291 of 1984 Fed. Rep. of Germany.
62-249110 of 1987 Japan.
2192271 of 1988 United Kingdom.

Primary Examiner—David C. Nelms
Assistant Examiner—K. Shami
Attorney, Agent, or Firm—Louis Weinstein

[57] ABSTRACT

Position, velocity and direction of movement of a linear motor is determined by a fiberoptic encoder comprised of first and second fiberoptic bundles. The first ends of each of the bundles have their fibers arranged within a narrow elongated slit, the fibers of each bundle being distributed substantially along the entire length of the slit and further so that the fibers of the bundles are substantially interspersed with one another along said slit. One of the bundles conveys light directed upon the opposite end of the bundle to a surface adjacent said slit and along which the linear motor is moving. The remaining bundle conveys light reflected from the surface to a sensor which converts the intensity of the reflected light into an electrical signal. Changes in the reflectivity of the surface, which may be the etched stator of a linear motor system are utilized to determine the position of the linear motor along the stator. The direction of movement is determined through the utilization of a pair of encoders of the type described wherein the slits of each encoder are arranged in spaced parallel fashion, the spacing being related to the spacing of the pattern on the etched stator to obtain motion and direction detection. Use of a plurality of pairs of encoders having the aforesaid arrangements provides for position, acceleration velocity and direction detection as well as rotation detection.

25 Claims, 3 Drawing Sheets

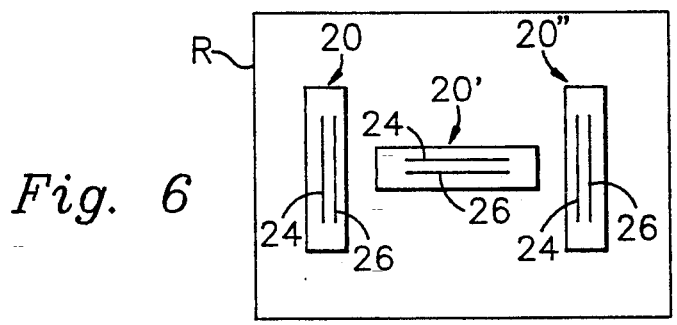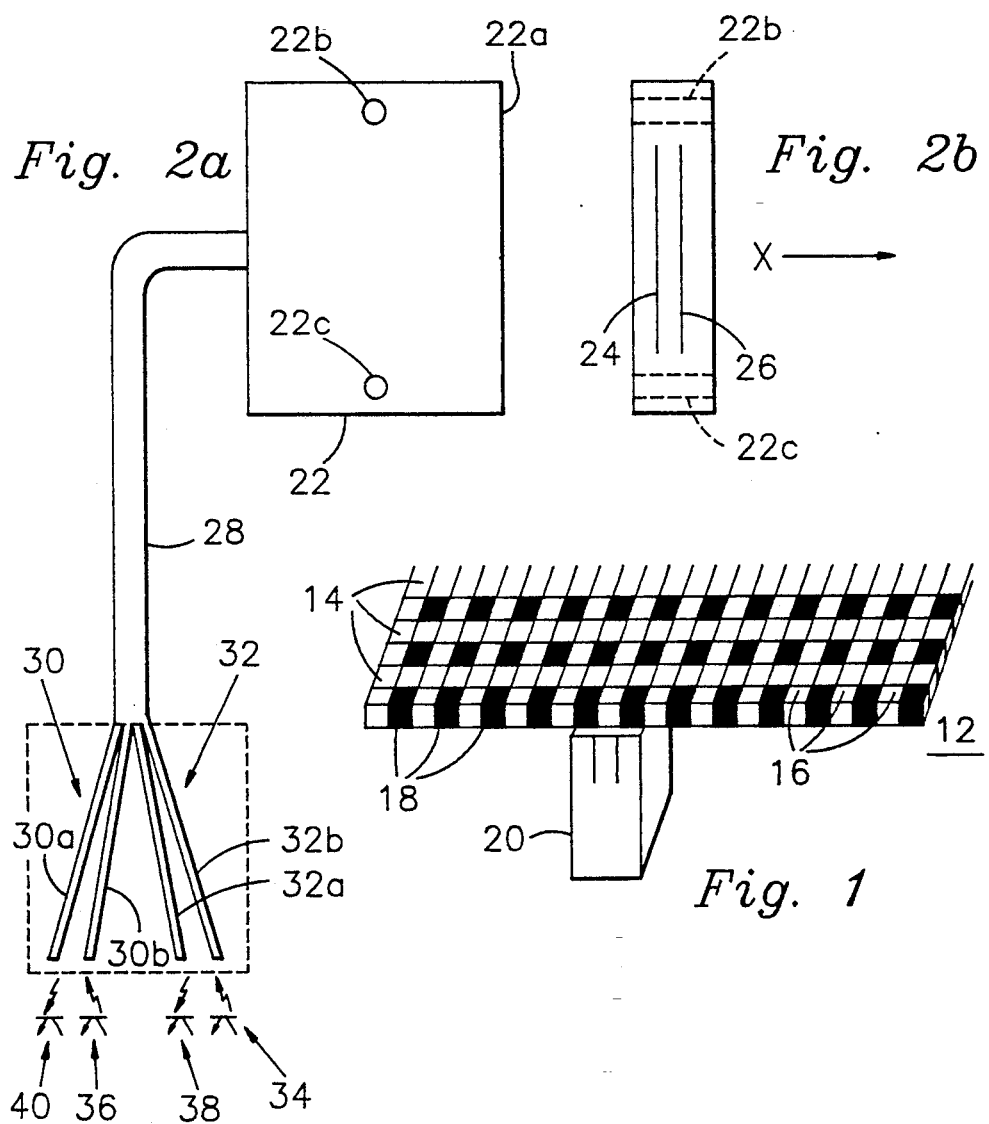

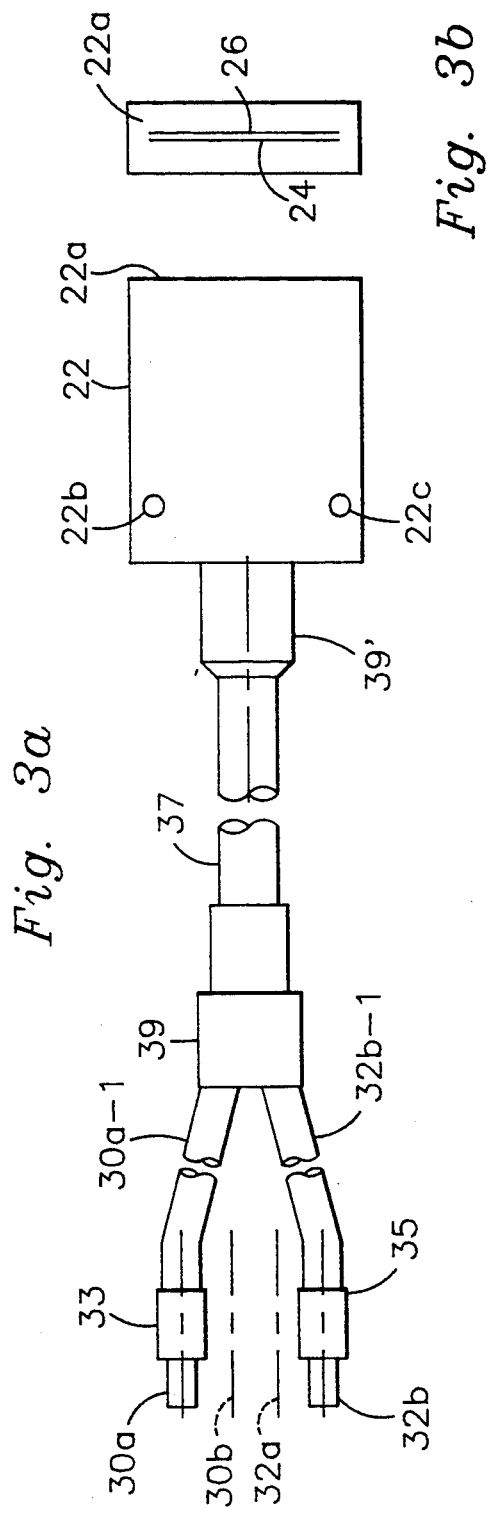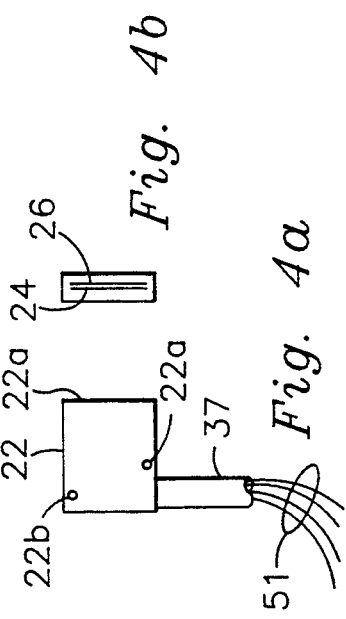

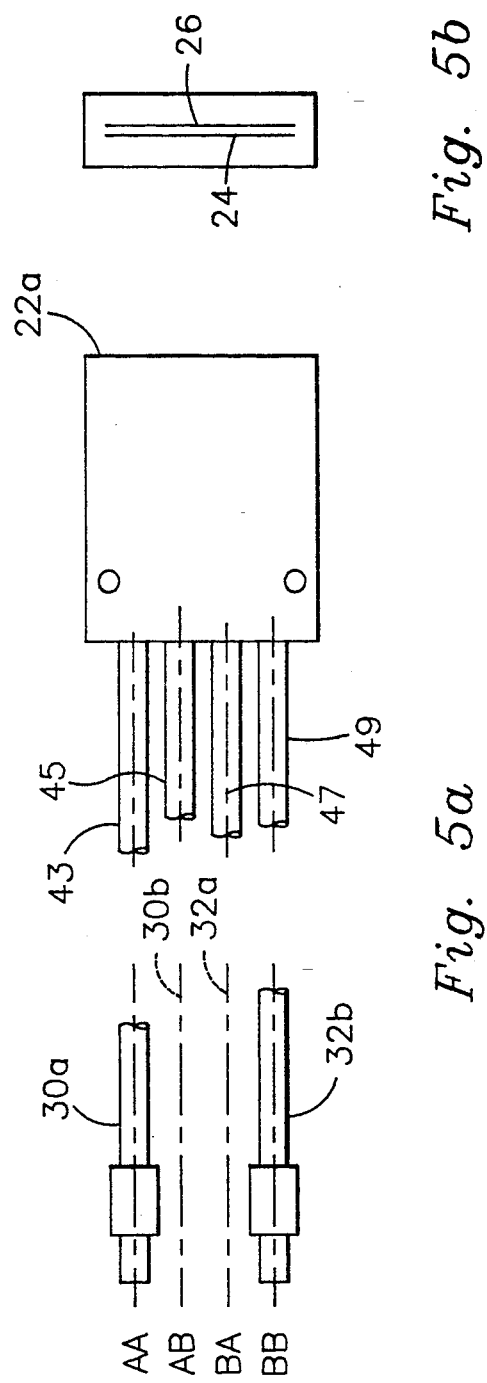

FIBEROPTIC ENCODER FOR LINEAR MOTORS AND THE LIKE

FIELD OF THE INVENTION

The present invention relates to encoders and more particularly to a novel fiberoptic encoder utilized for position and direction detection and especially adapted for use in linear motor systems and the like.

BACKGROUND OF THE INVENTION

Encoders are typically utilized for providing position information. For example, U.S. Pat. No. 4,823,062, issued Apr. 18, 1989 to the assignee of the present application, discloses apparatus for position and direction detection employing conventional light sources and light sensitive elements. These devices have the drawbacks of being rather bulky and large and are not totally reliable.

BRIEF DESCRIPTION OF THE INVENTION

The present invention is characterized by comprising an encoder which, in addition to being low in cost, is compact and reliable and provides highly accurate position and direction detection information.

An encoder channel comprises a first fiberoptic bundle comprised of fibers which convey light from a light emitting diode (LED) to a small area of the surface of a platen adjacent a first end of the fibers which platen functions as the etched stator of an XY (i.e. two dimensional) linear motor system. The area of illumination is configured as a narrow elongated slit. A second fiberoptic bundle comprised of fibers and having a first end, whose fibers are comingled with the first ends of the first fiberoptic bundle directing the light to the surface of the etched stator, collects reflected light over the same controlled area of the platen, providing an optical signal to a phototransistor, for example, for converting the optical signal into an electrical signal which represents the position of the encoder relative to the stator poles of the XY motor. By combining two encoder channels whose light transmitting and collecting slits are spaced appropriately relative to the pitch of the stator poles arranged on the platen, the position and direction of the encoder can be calculated relative to the platen providing position feedback for motion systems employing XY linear motor technology. By using three such encoders on an XY motor, the direction, position, rotation, velocity and acceleration of the motor can be easily calculated to provide closed loop control of the motor. The optical fibers making up the fiberoptic bundle, in addition to being distributed along the length of each slit, are preferably arranged so that the fibers of the first and second bundles of each encoder channel are distributed in alternating fashion. Thus, the optical fibers of the bundles may occupy effectively the same region to provide an encoder of simplified design and yet which provides highly accurate position, direction and acceleration information. The number of fibers in the first and second bundles may differ, the chosen number being sufficient to provide suitable light for illuminating the platen and to convey reflected light from a suitable length of the platen.

The encoder design permits precision information to be obtained without any special treatment of the stator surface. The length and thickness of the illuminated region is sufficient to smooth out the effects of any irregularity, thus further enhancing the accuracy of the system.

OBJECTS OF THE INVENTION

It is, therefore, one object of the present invention to provide a novel encoder system for providing highly accurate position and direction information through the employment of fiberoptic techniques.

Still another object of the present invention is to provide a novel encoder for obtaining highly accurate position and direction information through the use of first and second fiberoptic bundles for respectively illuminating a narrow elongated region and for conveying light reflected over the entire region to suitable light sensing means.

Still another object of the present invention is to provide a novel encoder employing fiberoptic bundles for respectively conveying light which is directed to a surface and for conveying light which is directed to a surface and for conveying light reflected from said surface to a light sensitive element wherein the first and second bundles have the ends thereof adjacent said surface arranged within and along a narrow elongated slit.

Still another object of the present invention is to provide a novel encoder employing fiberoptic bundles for respectively conveying light which is directed to a surface and for conveying light reflected from said surface to a light sensitive element wherein the first and second bundles have the ends thereof adjacent said surface arranged within a narrow elongated slit wherein the optical fibers of said first and second bundles are distributed over substantially the entire length of the slit.

Still another object of the present invention is to provide a novel encoder employing fiberoptic bundles for respectively conveying light which is directed to a surface and for conveying light reflected from said surface to a light sensitive element wherein the first and second bundles have the ends thereof adjacent said surface arranged within a narrow elongated slit and wherein the optical fibers of said first and second bundles are arranged in substantially alternating fashion along said slit.

BRIEF DESCRIPTION OF THE FIGURES

The above, as well as other objects of the present invention will become apparent when reading the accompanying description and drawings, in which:

FIG. 1 is a perspective view showing one application of the present invention for use in position detection;

FIG. 2a shows an end view of an encoder design in accordance with the principles of the present invention;

FIG. 2b shows a front view of the encoder of FIG. 2a;

FIGS. 3a and 3b show side and front views of still another encoder embodiment of the present invention;

FIGS. 4a and 4b show side and front views of still another encoder embodiment of the present invention;

FIGS. 5a and 5b shows side and front views of still another encoder embodiment of the present invention; and FIG. 6 is a plan view showing an arrangement using a plurality of encoders for sensing speed, direction, rotation and distance.

DETAILED DESCRIPTION OF THE INVENTION AND THE PREFERRED EMBODIMENTS THEREOF

FIG. 1 shows a simplified version of a system 10 utilizing the encoder of the present invention to great advantage and comprising a stator 12 which is typically a flat sheet of suitable ferromagnetic material having its top surface etched in such a manner as to provide a plurality of spaced parallel grooves 14 extending in an X or horizontal direction and a second group of spaced parallel grooves 16 extending in a Y or vertical direction, which sets of grooves 14 and 16 cooperate to define a plurality of teeth 18 arranged in a regular XY grid. The grooves are typically filled with a suitable non-magnetic material and the surface is machined and polished to provide a smooth finish. However, the material filling the grooves 14 and 16 has a reflectivity coefficient which is less than the reflectivity coefficient of the top surfaces of metal teeth 18. It should be understood that the width of the grooves 16, 18 has been exaggerated to aid in the understanding of the invention.

One typical system incorporating such stators is described in U.S. Pat. No. 4,890,241, issued Dec. 26, 1989 and assigned to the assignee of the present invention. The system described therein is a robotic system in which one or more robots, each provided with two-dimensional linear motor means, move along a stator of the type shown at 12 in FIG. 1 of the present invention by application of appropriate stepping pulses and directional signals enabling each robot to move in mutually perpendicular or "X" and "Y" directions, typically for the purpose of picking up a component and placing it upon a workpiece, selecting a tool arm to be coupled to the robot and moving the tool arm over the workpiece to perform a particular manipulative activity, and sot forth.

In systems of this nature it is extremely important to provide positional information for feedback purposes in order to accurately position the component, tool arm or the like at a precise location above the workpiece selected by the operating program.

To date, conventional system employ unitary light sources and light sensitive elements and further utilize stators in which the grooves and teeth are finished in contrasting colors to cooperate with suitable sensors and filters for detecting same.

Encoder 20 of the present invention greatly enhances the sensitivity and accuracy of the positional and direction information obtained and eliminates the need for any specialized treatment or finishing of the stator 12.

As was described hereinabove in connection with U.S. Pat. No. 4,890,241 whose subject matter is incorporated herein by reference thereto, a robot having any XY linear motor moves over the surface of a stator, such as, for example, the stator 12 shown in FIG. 1 of the present invention. Encoder 20 is mounted upon the robot in order to direct light to the stator surface and to convey light reflected from the stator surface to a suitable sensor. The openings 22b and 22c in housing 22 are utilized for purposes of mounting the housing to a suitable body such as, for example, a mounting surface of a robot, the housing being mountable to such a body by means of suitable threaded fasteners (not shown), for example. The encoder 20 is positioned in close proximity to the stator surface and, as shown in FIG. 2, is comprised of a housing 22 having a surface 22a provided with a pair of spaced parallel slits 24, 26. In one preferred embodiment the length of the slits is of the order of 1.0 inches and the (uniform) thickness of the slits is 0.010 inches. The centerline-to-centerline distances between slits 24 and 26 is preferably either greater than or less than the length of a tooth 18. In one preferred embodiment teeth 18 have a square shape with the length (and hence the width) dimension being 0.040 inches. Thus, the centerline-to-centerline spacing S between slits 24 and 26 is 0.20 plus multiples of 0.040 inches, i.e. $S = \pm 0.020 + n(0.040)$, where $n=0, 1, 2, \ldots, N$. Generally speaking, the spacing between slits 24, 26 is determined by the pitch P of the platen which may vary from 0.01 to 0.09 inches, i.e. $S = \pm 0.020 + nP$.

A fiberoptic bundle 28 suitably wrapped in an enclosing sheath has a first end extending into housing 22 and a second end divided into first and second bundle pairs 30 and 32, each bundle pair being comprised of individual bundles 30a, 30b and 32a, 32b. Each individual bundle, such as, for example, 30a is made up of a plurality of optical fibers. Bundle 30b is made up of a second group of optical fibers which may be substantially equal in number to bundle 30a. The optical fibers in each bundle are of conventional design capable of conveying light directed to a first end through the fiber to the second end thereof. The fibers, in one preferred embodiment, have a nominal diameter of the order of 30 microns. The number of fibers in each bundle need not be equal. The number of fibers in bundles 30b, 32b need only be sufficient to provide sufficient illumination by the platen 12. The number of fibers in bundles 30a, 32a should be sufficient to be distributed over the length of the slit. Thus, some of the fibers may not be used in any of the bundles 30a, 30b, 32a and 32b.

All of the optic fibers of bundles 30a and 30b have their opposing ends, which extend into housing 22, distributed along substantially the entire length of the slit 24. The fibers making up bundles 30a and 30b are distributed along slit 24 preferably so that the fiber bundles 30a and 30b are arranged in substantially alternating fashion or, equivalent thereto, the fibers are randomized so that the fibers of bundles 30a and 30b extend substantially over the entire length of slit 24 and are arranged in an alternating fashion to the greatest practical extent.

In a similar fashion, the fibers of each of the bundles 32a and 32b are merged and are distributed substantially along the entire length of slit 26 and are randomized in a similar fashion to that described hereinabove with regard to the fibers of merged bundles 30a, 30b arranged within slit 24.

Based on the dimensions and geometry of the fibers and slits described hereinabove, it can be seen that a multiple number of fibers extend over the narrow width of the slit as well as along the entire length of the slit. Although the length of each slit 24, 26 is not critical, it is preferred that the length of each slit be at least as great as the linear distance measured along several consecutive teeth. As a practical matter, the greater the length of the slit, the greater the accuracy of the encoder since the slits average and "smooth" the light directed to the stator surface as well as the light reflected from the stator surface which serves to "smooth out" any irregularities which may be encountered on the stator surface.

An LED illuminator 34, 36 is provided for each bundle pair and is located in close proximity to the free ends of the fibers making up bundles 32b and 30b. Light sensitive elements such as phototransistors 38 and 40 are located in close proximity to the free ends of the bundles 32a and 30a, as shown.

In operation, light from the LED illuminators 34 and 36 and conveyed respectively along the fibers of bundles 32b, 30b direct two narrow "slit-shaped" beams of light upon the etched surface of stator 12. The encoder is aligned so that the slits 24 and 26 are aligned parallel to the "Y" groove 16 to detect motion in the "X" direction.

The "slit-shaped" beams of light directed to the etched stator surface 12 are reflected therefrom (which beams are detected over substantially the entire length of their slits), and are conveyed through the appropriate bundle of optical fibers to the sensing elements 38 and 40 for slits 26 and 24, respectively. The intensity of the light detected is a function of the reflectivity of the surface portion reflecting the light impinging thereon, said surface being either a groove, a tooth or a transitional region at the boundary lines thereof. Direction information is determined through a conventional "quadrature" technique wherein, analogous to an angular shaft encoder, the pulses developed by the groove 14 (or 16) detected by slit 24 occur either ahead of or behind the pulses developed by grooves 14 (or 16) detected by slit 26, the time occurrence of the pulses (i.e. the occurrence of the pulses detected by slit 24 occurring either before or after the pulses detected by slit 26) being determinative of the direction of movement, the frequency of occurrence of the pulses determining the velocity of the encoder, and hence the robot, relative to stator 12 and the count of pulses being determinative of distance and hence position. The "quadrature" technique may be obtained through either dedicated hardware or software approaches.

FIGS. 3a and 3b show another alternative arrangement in which each of the individual bundles 30a, 30b, 32a and 32b terminate in a tightly bound bundle having a diameter of the order of 2 millimeters, the individual fibers having a diameter of the order of 30 microns, each bundle being covered with a monocoil tubing sleeve 30a-1, 32b-1, for example. Mounting bushings 33 and 35 have a diameter of the order of 0.25 inches. The bundles 30a, 30b, 32a and 32b merge into a unified bundle, likewise covered by a monocoil tubing sleeve 37. A bushing 39 is provided at the merging point between the individual bundles 30a-32b and the merged bundle 37. A bushing 39' is fixed to the left-hand end of housing 22a where the bundle enters into housing 22. Openings 22b, 22c are utilized to mount the housing to the robot.

Slits 24 and 26 in end surface 22a have a centerline-to-centerline distance of 0.020 inches and each have a length of one inch and a width of 0.010 inches. The housing has a length of 1.25 inches and a width of 0.37 inches. The spacing between adjacent ends of the slits 24 and 26 is 0.010 inches.

FIG. 4a shows a somewhat modified embodiment wherein the unified bundle 37 has a longitudinal axis which extends into housing 22 in a direction parallel to the end surface 22a having slits 24 and 26.

FIGS. 5a and 5b show still another embodiment wherein the individual bundles 30a-32b are each enclosed within suitable PVC tubes 43, 45, 47 and 49 having longitudinal axes which extend perpendicular to surface 22a having slits 24 and 26.

The embodiment shown in FIGS. 4a and 4b may alternatively house the photodetectors, phototransistors and all fiberoptics within housing 22 wherein electrical leads 51 extend from housing 22 for connection into the circuitry utilized to determine position, direction and velocity, and if desired, acceleration, based upon the electrical signals developed by the light sensitive phototransistors 36, 40, shown, for example, in FIG. 2a.

FIG. 6 shows apparatus employing three encoders which may be any one of the types described in FIGS. 2a-5b, three such encoders 30, 20' and 20" being mounted upon the surface of a robot R, for example, in the perpendicular arrangement shown wherein the encoders 20 and 20' are utilized for detecting movement and direction in the "X" and "Y" directions and encoder 20" being utilized for purposes of detecting rotation in conjunction with the other detectors.

Although the present invention is described as being capable of use in a two-dimensional linear motor system, it should be understood that the detector may be utilized in any applications wherein it is desirable to detect movement and position of a body moving along a surface having a detectable pattern or criteria such as slits, grooves or the like arranged in spaced parallel fashion upon a surface, the encoder being mounted upon a member moving relative to said surface. In applications wherein it is desired to obtain only positional information the encoder need only be provided with a single slit having two cooperating bundles for conveying light to the slit and for conveying reflected light from the slit. A single encoder 20 utilizing a pair of spaced parallel slits is all that is required for measuring distance and detecting velocity and direction of movement in only a single direction.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described. For example, the bundles 30b, 32b may be illuminated by a single LED or may be merged into one bundle at their input end which is illuminated by one LED.

What is claimed is:

1. Encoder means mounted upon a linear motor for detecting movement of said linear motor along a platen surface having a predetermined surface pattern of grid lines wherein portions of the pattern have a reflectivity characteristic which is different from the reflectivity characteristic of the remainder of said platen surface, said encoder means comprising:

a plurality of flexible, elongated optical fibers each capable of transmitting light rays impinging on one end to an opposite end thereof and being arranged in a bundle;

a housing having an opening for receiving said fibers and for maintaining said fibers in said bundle in intimate contact;

said housing having a narrow, elongated, linear slit positioned in close proximity to said surface;

the free ends of fibers in said bundle extending into and terminating at said slit;

said slit having a predetermined length;

the free ends of the fibers substantially completely filling said slit;

a first portion of the group of fibers being gathered together to form a first light conveying branch bundle extending away from said slit;

a second portion of remaining fibers of said group of fibers being gathered together to form a second light conveying branch bundle extending away from said slit;

the ends of the fibers in said first light conveying branch bundle extending into said main bundle being distributed along the length of said slit;

the ends of the fibers in said second branch bundle being distributed along the length of said slit;

means for directing light rays onto the free ends of the fibers in said first branch bundle, whereby the free ends of the first branch bundle fibers extend into said slit to direct light upon said surface along a full length of said slit;

sensing means positioned adjacent a free end of said second branch bundle for generating a signal responsive to light rays reflected by said platen surface onto said main bundle and conveyed by the fibers in said second branch bundle to said sensing means;

the length of said slit being greater than a pitch of the grid lines on the platen surface being scanned by said encoder means.

2. The encoder means of claim 1 wherein the length of said slit is approximately 1.0 inch.

3. The encoder means of claim 1 wherein the pattern on said platen surface is comprised of first and second sets of grid lines orthogonal to one another each set being spaced apart at predetermined uniform distances; the length of said slit being greater than said predetermined uniform distance.

4. The encoder means of claim 3 wherein said uniform distance is of the order of 0.004 inches.

5. The encoder means of claim 3 wherein the grid lines define teeth arranged in regular rows and columns, said teeth being arranged twenty-five teeth per inch.

6. The encoder means of claim 5 wherein the length of said slit is significantly greater than the length of a tooth.

7. The encoder means of claim 6 wherein the slit is of the order of 1.0 inches.

8. Encoder means comprising:
a housing mounted upon a linear motor and having a surface provided with a pair of elongated, narrow slits arranged in spaced parallel fashion;
said linear motor being movable along a platen surface;
said slits being positioned in close proximity to said platen surface;
a plurality of elongated light transmissive optical fibers arranged in first and second groups;
a first end of each of said first and second groups of fibers each arranged in one of said slits and being tightly bundled therein forming first and second main bundles;
said slits each forming elongated linear openings;
the opposite ends of each main bundle being divided into first and second branch bundles;
the optical fibers of each branch bundle being arranged along the length of its associated slit;
means for introducing light rays into the fibers of each first branch bundle for directing light upon said surface of said platen adjacent said slits; and
means for converting light rays reflected from said platen surface and conveyed by each of said second branch bundles into electric signals for representing one of distance, velocity and acceleration.

9. The encoder means for claim 8 wherein the platen surface along which said detection means is moved is provided with first and second rows of spaced parallel grooves arranged perpendicular to one another to form a grid-like pattern;
the spacing between said slits being less than the spacing between adjacent parallel grooves.

10. The encoder means of claim 8 wherein the spacing between adjacent parallel grooves is in the range from 0.010 to 0.090 inches.

11. The encoder means of claim 10 wherein the spacing between said slits is of the order of 0.010 inches.

12. The encoder means of claim 10 wherein the spacing between the center lines of said slits is $S = \pm 0.020$ inches $+ n(P$inches$)$, where $n = 0, 1, 2, \ldots N$ and $P$ is the pitch between said grooves.

13. The encoder means of claim 8 wherein the fibers of said first and second branch bundles are interspersed in alternating fashion in each slit.

14. The encoder means of claim 8 wherein each of said branch bundles is arranged within a covering sleeve.

15. The encoder means of claim 8 wherein the grid lines define teeth arranged in regular rows and columns, said teeth being arranged twenty-five teeth per inch.

16. The encoder means of claim 8 wherein said optical fibers, said means for introducing light rays, and said means for converting light rays are all contained within said housing.

17. The encoder means of claim 8 wherein the hollow housing of substantially perpendicular parallelipiped shape;
said slits being arranged in one surface of said housing;
said optical fiber bundles extending into a surface of said housing which is opposite and parallel to said surface having said slits.

18. The encoder means of claim 8 wherein the hollow housing is of substantially perpendicular parallelipiped shape;
said slits being arranged in one surface of said housing;
said optical fiber bundles extending into a surface of said housing which is opposite and parallel to said surface having said slits.

19. The encoder means of claim 8 wherein the hollow housing is of substantially perpendicular parallelipiped shape;
said slits being arranged in one surface of said housing;
said optical fiber bundles extending into a surface of said housing which is adjacent and perpendicular to the surface containing said slits.

20. Means for detecting the movement of a linear motor in mutually perpendicular directions relative to a stationary platen including first and second encoder means, each encoder means comprising:
a housing having a surface provided with a pair of elongated, narrow slits arranged in spaced parallel fashion;
a plurality of elongated light transmissive optical fibers arranged in first and second groups;
a first end of each of said first and second groups of fibers each arranged in one of said slits and being tightly bundled therein forming first and second main bundles;
the opposite ends of each main bundle being divided into first and second branch bundles;
said first and second branch bundles of each main bundle having a substantially equal number of optic fibers;

the optic fibers of each branch bundle being arranged along an entire length of its associate slit;

means for introducing light rays into the fibers of each first branch bundle for directing light along an entire length of the slit upon a platen surface adjacent said slits;

means for converting light rays reflected from said surface and conveyed by said second branch bundles into electric signals for representing one of distance velocity and acceleration;

the slits of said first encoder means being arranged on said linear motor perpendicular to the slits of said second encoder means.

21. Means for detecting the movement of a linear motor in mutually perpendicular directions relative to a surface of a stationary platen including first, second and third encoder means, each encoder means comprising:

a housing having a surface provided with a pair of elongated, narrow slits arranged in spaced parallel fashion;

a plurality of elongated light transmissive optical fibers arranged in first and second groups;

a first end of each of said first and second groups of fibers each arranged in one of said slits and being tightly bundled therein forming first and second main bundles;

the opposite ends of each main bundle being divided into first and second branch bundles;

said first and second branch bundles of each main bundle having a substantially equal number of optic fibers;

the optic fibers of each branch bundle being arranged along the length of its associated slit;

means for introducing light rays into the fibers of each first branch bundle for directing light upon a surface of said platen adjacent said slits;

means for converting light rays reflected from said platen surface and conveyed by said second branch bundles into electric signals;

the slits in said first and second encoder means being arranged on said body so as to be parallel to one another;

the slits in said third encoder means being arranged on said body so as to be perpendicular to the slits of said first and second encoder means.

22. The encoder means of claim 8 wherein the means for introducing light rays into the fibers of said first branch bundles is a single light source.

23. The encoder means of claim 22 wherein said single light source is a light emitting diode.

24. The encoder means of claim 8 wherein the means for introducing light rays into the fibers of said first branch bundles is a single light source;

the ends of said first branch bundles receiving light from said single light source being commingled into a common bundle to receive light from said light source.

25. The encoder means of claim 15 wherein said slits have a length substantially greater than several of said teeth.

* * * * *

UNITED STATES PATENT AND TRADEMARK OFFICE
CERTIFICATE OF CORRECTION

PATENT NO. : 5,324,934
DATED : June 28, 1994
INVENTOR(S) : Lee Clark

It is certified that error appears in the above-indentified patent and that said Letters Patent is hereby corrected as shown below:

```
Column 2, lines 20 and 21, delete "which is directed to a
          surface and for conveying light".
Column 3, line 37, change "sot" to --so--.
Column 6, line 8, change "30" to --20--.
```

Signed and Sealed this

Eleventh Day of April, 1995

Attest:

BRUCE LEHMAN

*Attesting Officer*   *Commissioner of Patents and Trademarks*